(12) United States Patent
Boss et al.

(10) Patent No.: US 8,121,743 B2
(45) Date of Patent: Feb. 21, 2012

(54) POWER RESTORATION MANAGEMENT METHOD AND SYSTEM

(75) Inventors: Gregory Jensen Boss, Saginaw, MI (US); Rick Allen Hamilton, II, Charlottesville, VA (US); Julianne Frances Haugh, Austin, TX (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 12/623,891

(22) Filed: Nov. 23, 2009

(65) Prior Publication Data

US 2011/0125335 A1 May 26, 2011

(51) Int. Cl.
*G06F 19/00* (2011.01)

(52) U.S. Cl. ......... 700/295; 700/286; 700/291; 323/318

(58) Field of Classification Search .................. 700/286, 700/291–293, 295; 323/318
See application file for complete search history.

(56) References Cited

U.S. PATENT DOCUMENTS

| | | | |
|---|---|---|---|
| 5,684,710 A * | 11/1997 | Ehlers et al. | 700/293 |
| 7,002,265 B2 | 2/2006 | Potega et al. | |
| 7,043,340 B2 * | 5/2006 | Papallo et al. | 700/292 |
| 7,231,281 B2 | 6/2007 | Costa et al. | |
| 7,965,195 B2 * | 6/2011 | Deaver et al. | 340/660 |
| 2006/0259199 A1 | 11/2006 | Gjerde et al. | |
| 2007/0228832 A1 * | 10/2007 | Pratt et al. | 307/31 |
| 2008/0231114 A1 | 9/2008 | Tolnar et al. | |
| 2008/0272934 A1 * | 11/2008 | Wang et al. | 340/870.11 |
| 2009/0187285 A1 * | 7/2009 | Yaney et al. | 700/292 |
| 2011/0004355 A1 * | 1/2011 | Wang et al. | 700/286 |
| 2011/0022239 A1 * | 1/2011 | Forbes et al. | 700/286 |

FOREIGN PATENT DOCUMENTS

| | | |
|---|---|---|
| JP | 2003244842 | 8/2003 |
| JP | 2005100096 | 4/2005 |
| WO | WO2007/060669 | 5/2007 |

OTHER PUBLICATIONS

"Distributed Automation for back-feed network power restoration", Mekic et al, IEEE 2009.*
"Design of adaptive load shedding by artificial neural networks", Hsu et al, IEE Proceedings online No. 20041207, IEE 2005.*

\* cited by examiner

*Primary Examiner* — Michael D Masinick
(74) *Attorney, Agent, or Firm* — Schmeiser, Olsen & Watts; Anna Linne

(57) ABSTRACT

A power restoration method and system. The method includes receiving by a computer processor of a computing apparatus, a signal indicating that a power outage has ended and that an input voltage signal used for powering power consumption devices at a first specified location power will be enabled. The computer processor disables input voltage signal connections to the power consumption devices and detects that the input voltage signal is enabled. The computer processor enables a first input voltage signal connection associated with a first power consumption device and monitors a frequency signal associated with the input voltage signal. The computer processor generates frequency level data comprising a frequency level of the frequency signal and compares the frequency level to a predetermined frequency level value. The computer processor generates results data comprising results of comparing the frequency level to a predetermined frequency level value.

20 Claims, 5 Drawing Sheets

POWER RESTORATION MANAGEMENT METHOD AND SYSTEM

FIELD OF THE INVENTION

The present invention relates to a method and associated system for restoring power to devices after a power outage.

BACKGROUND OF THE INVENTION

Managing power for various power consumption devices typically comprises an inaccurate process with little flexibility. Power systems providing power for power consumption devices typically provide power to the power consumption devices simultaneously. Providing power to the power consumption devices simultaneously limits any flexibility for restarting power.

SUMMARY OF THE INVENTION

The present invention provides a power restoration method comprising:

receiving, by a computer processor of a computing apparatus, a signal indicating that a power outage has ended and that an input voltage signal used for powering power consumption devices at a first specified location power will be enabled, said computing apparatus comprising a memory device, said memory device comprising a profile indicating an order for enabling each power consumption device of said power consumption devices;

disabling, by said computer processor, input voltage signal connections to each said power consumption device;

detecting, by said computer processor, that said input voltage signal at said first specified location is enabled;

first enabling, by said computer processor in response to said detecting and based on said profile, a first input voltage signal connection of said input voltage signal connections, wherein said first input voltage signal connection is associated with a first power consumption device of said power consumption devices, and wherein said first enabling said first input voltage signal connection enables said first power consumption device to receive said input voltage signal;

first monitoring, by said computer processor in response to said first enabling, a frequency signal associated with said input voltage signal at said first specified location;

generating, by said computer processor, first frequency level data associated with said first monitoring, wherein said first frequency level data comprises a first frequency level of said frequency signal;

first comparing, by said computer processor, said first frequency level to a predetermined frequency level value; and generating, by said computer processor, first results data comprising first results of said first comparing.

The present invention provides a computing system comprising a computer processor coupled to a computer-readable memory unit, said memory unit comprising instructions that when enabled by the computer processor implements a power restoration method comprising:

receiving, by said computer processor, a signal indicating that a power outage has ended and that an input voltage signal used for powering power consumption devices at a first specified location power will be enabled, said computing apparatus comprising a memory device, said memory device comprising a profile indicating an order for enabling each power consumption device of said power consumption devices;

disabling, by said computer processor, input voltage signal connections to each said power consumption device;

detecting, by said computer processor, that said input voltage signal at said first specified location is enabled;

first enabling, by said computer processor in response to said detecting and based on said profile, a first input voltage signal connection of said input voltage signal connections, wherein said first input voltage signal connection is associated with a first power consumption device of said power consumption devices, and wherein said first enabling said first input voltage signal connection enables said first power consumption device to receive said input voltage signal;

first monitoring, by said computer processor in response to said first enabling, a frequency signal associated with said input voltage signal at said first specified location;

generating, by said computer processor, first frequency level data associated with said first monitoring, wherein said first frequency level data comprises a first frequency level of said frequency signal;

first comparing, by said computer processor, said first frequency level to a predetermined frequency level value; and generating, by said computer processor, first results data comprising first results of said first comparing.

The present invention advantageously provides a simple method and associated system capable of managing power for various power consumption devices.

DETAILED DESCRIPTION OF THE INVENTION

Figure 1:
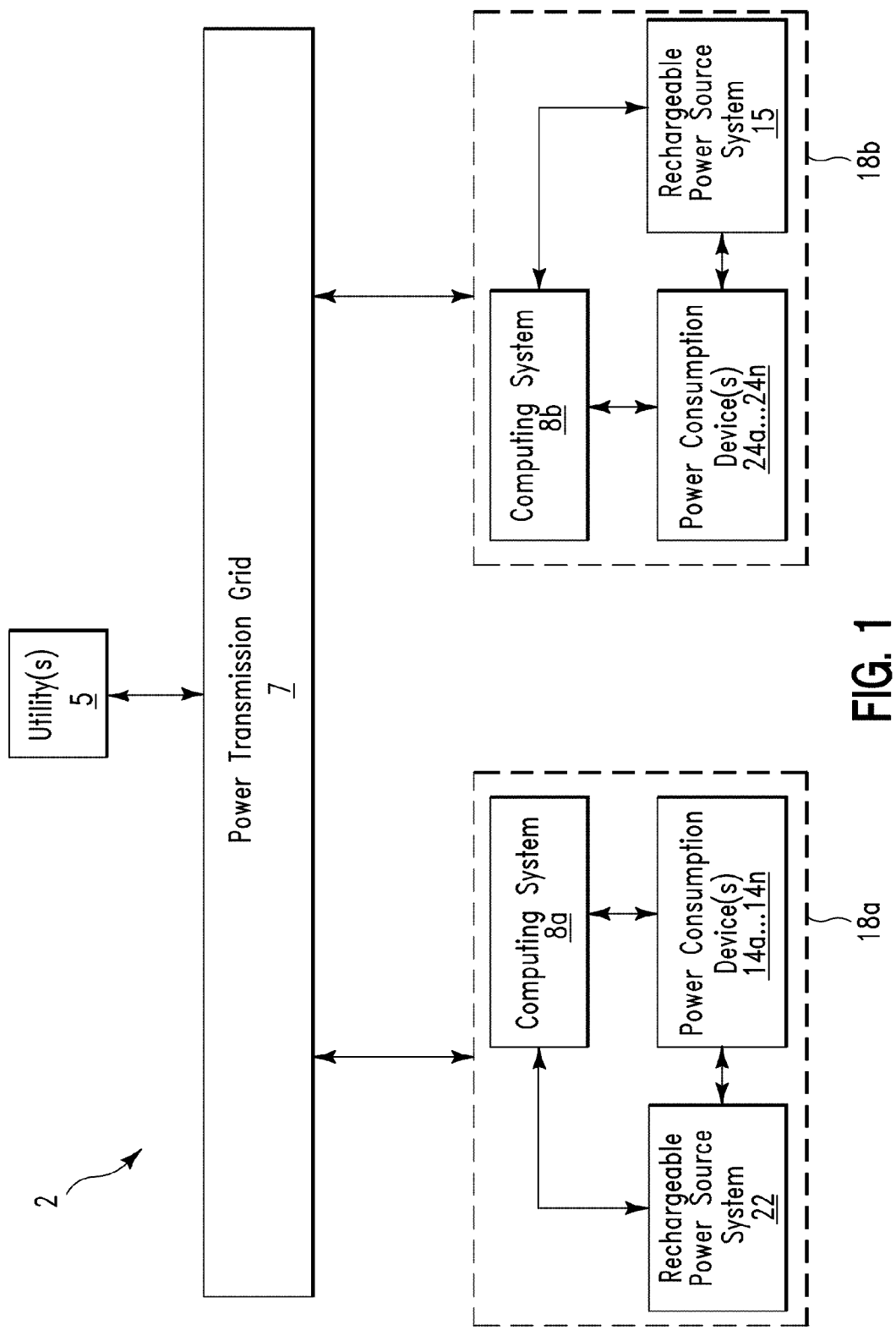
FIG. 1 illustrates a system for restoring power to power consumption devices after a power outage, in accordance with embodiments of the present invention.

FIG. 1 illustrates a system 2 for restoring power to power consumption devices 14a . . . 14n and 15a . . . 15n after a power outage, in accordance with embodiments of the present invention. Power consumption devices 14a . . . 14n and 15a . . . 15n may comprise any type of electrical device that consumes electrical power (e.g., appliances, a furnace, an oven an air conditioner, a computer, a hot water tank, an electric heater, battery charging devices, etc) provided by a utility(s) 5. Electrical power may be retrieved via a power grid (e.g., power transmission grid 7). System 2 comprises an intelligent system for systematically bringing power consumption devices 14a . . . 14n and 15a . . . 15n back on-line after a power outage. A power outage may comprise any type of power interruption (e.g., downed power lines, malfunctioning transformer, power generation equipment failure, etc) caused by any type of situation (e.g., weather conditions, over demand for power, grid component failure, control system failure, etc). Power consumption devices 14a . . . 14n and 15a . . . 15n may be turned back on (i.e., power applied) based on a priority listing and/or a level of power supply/demand balance. System 2 allows for:

1. Maintaining electric grid (e.g., power transmission grid 7) supply and demand balance in order to prevent overloading of the electric grid.
2. Ensuring that important power consumption devices are restored first (e.g., lights, furnace, etc)

Load fluctuations associated with power usage and/or a sudden demand for power (e.g., after a power outage) by electrical devices (e.g., power consumption devices 14a . . . 14n and 15a . . . 15n) may cause a frequency signal (e.g., 60 Hertz (Hz)) associated with a supply voltage retrieved from a power grid (e.g., power transmission grid 7) to fluctuate (e.g., rise or fall). When a frequency signal begins to fall below 60 Hz, power providers may bring additional power generation systems on-line. Likewise, when a frequency signal rises above 60 Hz, power providers disable specified power generation systems from the power grid. Power providers may use many different types of power generation systems, including, inter alia:
1. Long-term bulk power generation systems which are very cost effective but typically take a long time (e.g., over an hour) to bring on and off-line.
2. Short-term demand generation systems which are very expensive but may be brought on and off-line very quickly.

After a power outage has been restored, a power provider (a utility company) must provide power generation to match a combined electric load demand of all users on the power grid (e.g., users using power consumption devices 14a . . . 14n and 15a . . . 15n) such that a power frequency signal maintains a level that is as close as possible to a target frequency (e.g., 60 hz). The power provider will use a combination of short-term and long-term bulk power generation systems to match the power demand. Therefore, system 2 is enabled to (i.e., after power has been restored from a power outage) monitor the frequency signal and centrally orchestrate the restoration of power to power consumption devices 14a . . . 14n and 15a . . . 15n. System may restore power to power consumption devices 14a . . . 14n and 15a . . . 15n after a power outage by any of the following means including:
1. Automatically when power transmission grid is enabled.
2. When power transmission grid 7 frequency reaches a specified level (e.g. 60 Hz)
3. When a power company transmits a signal enabling permission.
4. In accordance with a profile indicating a specified order for enabling power to each of power consumption devices 14a . . . 14n and 15a . . . 15n. A profile may comprise, inter alia, a current time of day, a type of apparatus associated with each power consumption device, an amount of power consumed by each said power consumption device, etc.

System 2 comprises a computing system 8a and a computing system 8b connected to a utility(s) 5 through a power transmission grid 7. Computing system 8a is additionally connected to power consumption devices 14a . . . 14n and an optional rechargeable power source system 22. Power consumption devices 14a . . . 14n are connected to rechargeable power source system 22. Computing system 8b is additionally connected to power consumption devices 24a . . . 24n and an optional rechargeable power source system 15. Rechargeable power source system 22 may comprise rechargeable power sources (e.g., batteries), charging devices (e.g., a battery charger), and switches (e.g., relays, contactors, etc) for connecting and disconnecting the rechargeable power sources to/from power consumption devices 24a . . . 24n. Rechargeable power source system 15 may comprise rechargeable power sources (e.g., batteries), charging devices (e.g., a battery charger), and switches (e.g., relays, contactors, etc) for connecting and disconnecting the rechargeable power sources to/from power consumption devices 24a . . . 24n. The rechargeable power sources (i.e., of rechargeable power source system 15 and 22) may comprise a single rechargeable power source or a plurality of rechargeable power sources (associated with powering a single device or a plurality of different devices). The rechargeable power sources may comprise any type of rechargeable battery including, inter alia, lead acid, nickel cadmium, nickel metal hydride, lithium ion, lithium ion polymer, nanowire, etc. Computing system 8a, power consumption devices 14a . . . 14n, and rechargeable power source system 22 are located within a specified location 18a. Computing system 8b, power consumption devices 24a . . . 24n, and rechargeable power source system 15 are located within a specified location 18b. Specified location 18a and/or 18b may comprise a house and surrounding property, a building (associated with a business) and surrounding property, etc. Electrical power (i.e., for powering computing system 8a and 8b, power consumption devices 14a . . . 14n and 24a . . . 24n, and rechargeable power source system 22 and 14) may be retrieved via a power grid (e.g., power transmission grid 7). Utility(s) 5 may comprise any type of electrical power supplier(s) that produces and/or distributes electrical power (i.e., across power transmission grid 7). Utility(s) 5 may produce and/or distribute any type of electrical power including, inter alia, fossil fuel generated power, steam generated power, hydro generated power, solar generated power, wind generated power, fuel cell generated power, etc. Computing system 8a may comprise switches (e.g., relays, contactors, etc) for individually connecting and disconnecting power consumption devices 14a . . . 14n to/from power transmission grid 7. Computing system 8b may comprise switches (e.g., relays, contactors, etc) for individually connecting and disconnecting power consumption devices 24a . . . 24n to/from power transmission grid 7. Computing systems 8a and 8b may each comprise a memory system. The memory system may comprise a single memory system. Alternatively, the memory system may comprise a plurality of memory systems. The memory system may be internal to computing systems 8a and 8b or external to computing systems 8a and 8b. Computing system 8a and 8b may each comprise a software application (e.g., a power restoration manager for controlling functionality. Computing system 8a comprises a system for determining that power has been restored to/from the power transmission grid (i.e., after a power outage), monitoring a power grid (e.g., associated with power generated by utility(s) 5) frequency (e.g., 60 Hertz (Hz)), and independently enabling power for power consumption devices 14a . . . 14n from power transmission grid and/or rechargeable power source system 22 based on a value of a monitored frequency and additional data such as, inter alia, a profile associated with a specified order for enabling or returning power to power consumption devices 14a . . . 14n (e.g., high priority devices such as lights or a furnace may comprise a higher priority than an air conditioner or television). Computing system 8b comprises a system for determining that power has been restored to/from the power transmission grid (i.e., after a power outage), monitoring a power grid (e.g., associated with power generated by utility(s) 5) frequency (e.g., 60 Hertz (Hz)), and independently enabling power for power consumption devices 24a . . . 24n from power transmission grid and/or rechargeable power source system 15 based on a value of a monitored frequency and additional data such as, inter alia, a profile associated with a specified order for enabling or returning power to power consumption devices 24a . . . 24n (e.g., high priority devices such as lights or a furnace may comprise a higher priority than an air conditioner or television). Computing system 8a and 8b may operate during a power outage using rechargeable power source system 22 and automatically and independently restore power to power consumption devices 14a . . . 14n and 24a . . . 24n when power is restored. Alternatively (i.e., when power is restored after a power outage), computing system 8a and 8b may power up first and then intelligently determine how to restore power to downstream devices (i.e., power consumption devices 14a . . . 14n and 24a . . . 24n). For example, computing system 8a and 8b may (i.e., upon detecting restored power) immediately disconnect all downstream devices from the power transmission grid 7 and reconnect each device according to a priority profile and grid frequency level. Although system 2 is described with respect to monitoring a nominal frequency of 60 Hz (i.e., associated with power generated by utility(s) 5 and used in power generation in the United States), note that system 2 may be used to monitor any nominal frequency value. For example, system 2 may be used to monitor a nominal frequency value of 50 Hz (i.e., used in Europe, Africa, Asia, Australia, etc). Computing system 8a and 8b may communicates with utility(s) using any method including, inter alia, power line communication (PLC), IP-over-power, Internet, wireless, etc. PLC comprises a system for carrying data on a conductor used for electric power transmission. IP-over-Power comprises a system for using PLC by sending and receiving radio signals over power lines to provide access to the Internet.

The following steps illustrate an implementation example for restoring power to power consumption devices (e.g., power consumption devices 14a . . . 14n and 24a . . . 24n) after a power outage.

1. A power company (e.g., utility(s) 5) detects that power is about to be restored (i.e., after a power outage) to a given area (e.g., locations 18a and 18b).
2. A signal (i.e., indicating that power will be restored) is transmitted from the power company to power restoration manager computing systems (e.g., computing systems 8a and 8b).
3. Computing systems 8a and 8b determine that power is disconnected (e.g., via switches such as, inter alia, relays, contactors, etc) to all devices under its control (e.g., power consumption devices 14a . . . 14n and 24a . . . 24n).
4. The power restoration manager computing systems detect that power has been restored and reconnect (e.g., via a signal transmitted to individual devices or groups of devices that allow each device to begin consuming the available power) each power consumption device to the power transmission grid in a specified order according to a monitored frequency level of the input voltage and a profile associated with power consumption devices 14a . . . 14n and 24a . . . 24n.
5. Each power consumption device optionally transmits a response signal the power restoration manager computing systems to confirm they are now on-line.
6. The power restoration manager computing systems monitor the power transmission grid to ensure that a supply and demand (i.e., based on a frequency signal level) are in balance during restorations.
7. The power restoration manager computing systems optionally communicate with the power company to obtain approval for adding more load (i.e., power consumption devices).

Figure 2:
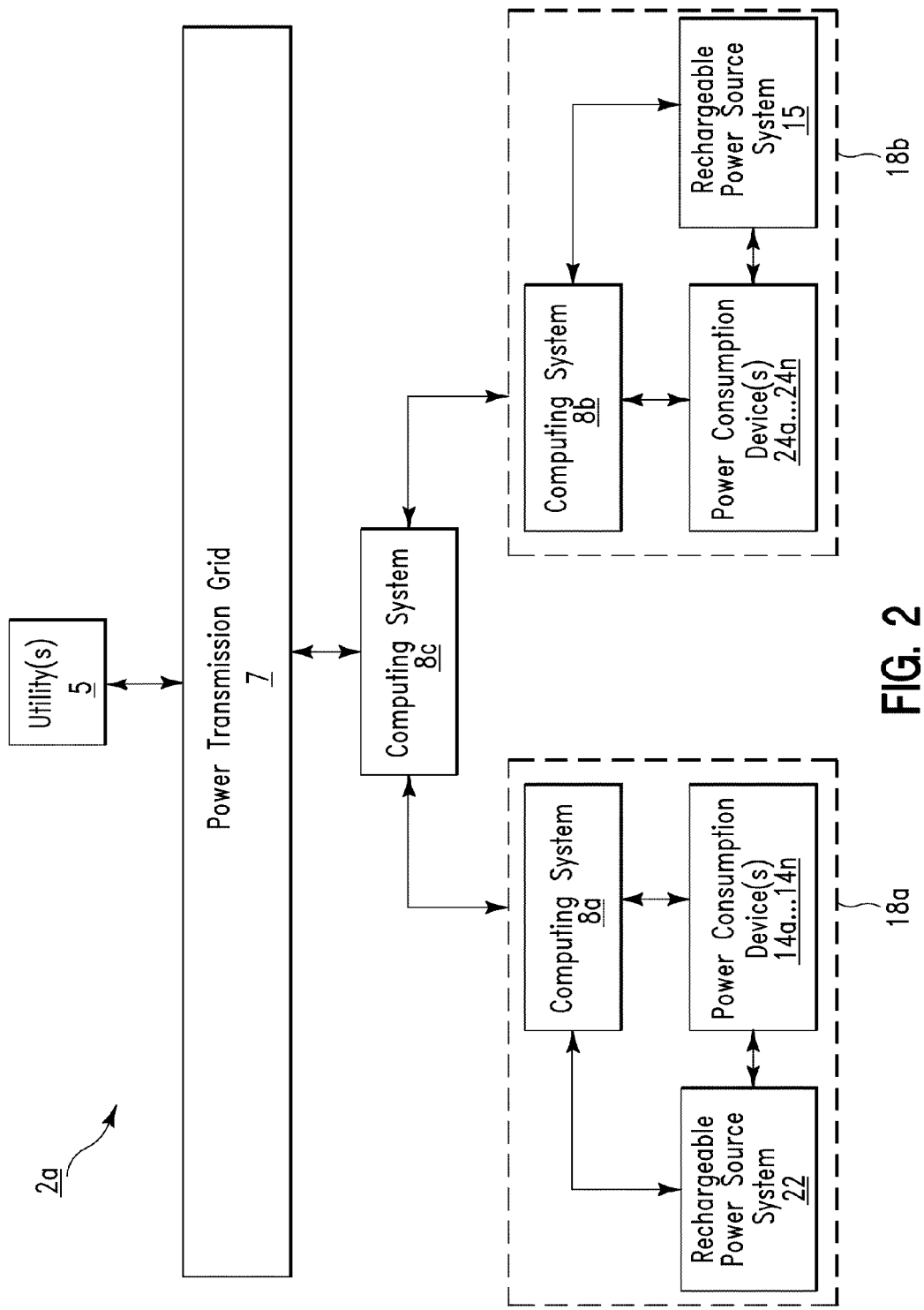
FIG. 2 illustrates an alternative system to the system of FIG. 1, in accordance with embodiments of the present invention.

FIG. 2 illustrates an alternative system 2a to system 2 of FIG. 1, in accordance with embodiments of the present invention. In contrast to system 2 of FIG. 1, system 2a of FIG. 2 comprises an additional regional computing system 8c for controlling a power restoration process for restoring power to power consumption devices 14a . . . 14n and 15a . . . 15n on a regional level (e.g., a geographic level). Computing system 8c enables additional control by establishing a hierarchical structure of power restoration. For example, utility 5 may transmit a signal to computing systems 8a and 8b indicating that they each may restore X amount of power. Computing system 8c is aware of how many local computing systems (e.g., computing systems 8a and 8b) it controls. Computing system 8c transmits a signal to computing system 8a and/or 8b to indicate when they may start restoring power and how much power may be restored. Computing system 8c may comprise a memory system. The memory system may comprise a single memory system. Alternatively, the memory system may comprise a plurality of memory systems. The memory system may be internal to computing system 8c or external to computing system 8c. Computing system 8c may comprise a software application (e.g., a power restoration manage) for controlling functionality. Computing system 8c comprises a system for determining that power has been restored to/from the power transmission grid (i.e., after a power outage), monitoring a power grid (e.g., associated with power generated by utility(s) 5) frequency (e.g., 60 Hertz (Hz)), and determining if computing systems 8a and 8b may enable power (and how much) power for power consumption devices 14a . . . 14n and 24a . . . 24n from power transmission grid and/or rechargeable power source system 22 and/0r 15 based on a value of a monitored frequency and additional data such as, inter alia, a profile associated with a specified order for enabling or returning power to power consumption devices 14a . . . 14n and 24a . . . 24n (e.g., high priority devices such as lights or a furnace may comprise a higher priority than an air conditioner or television).

Figure 3:
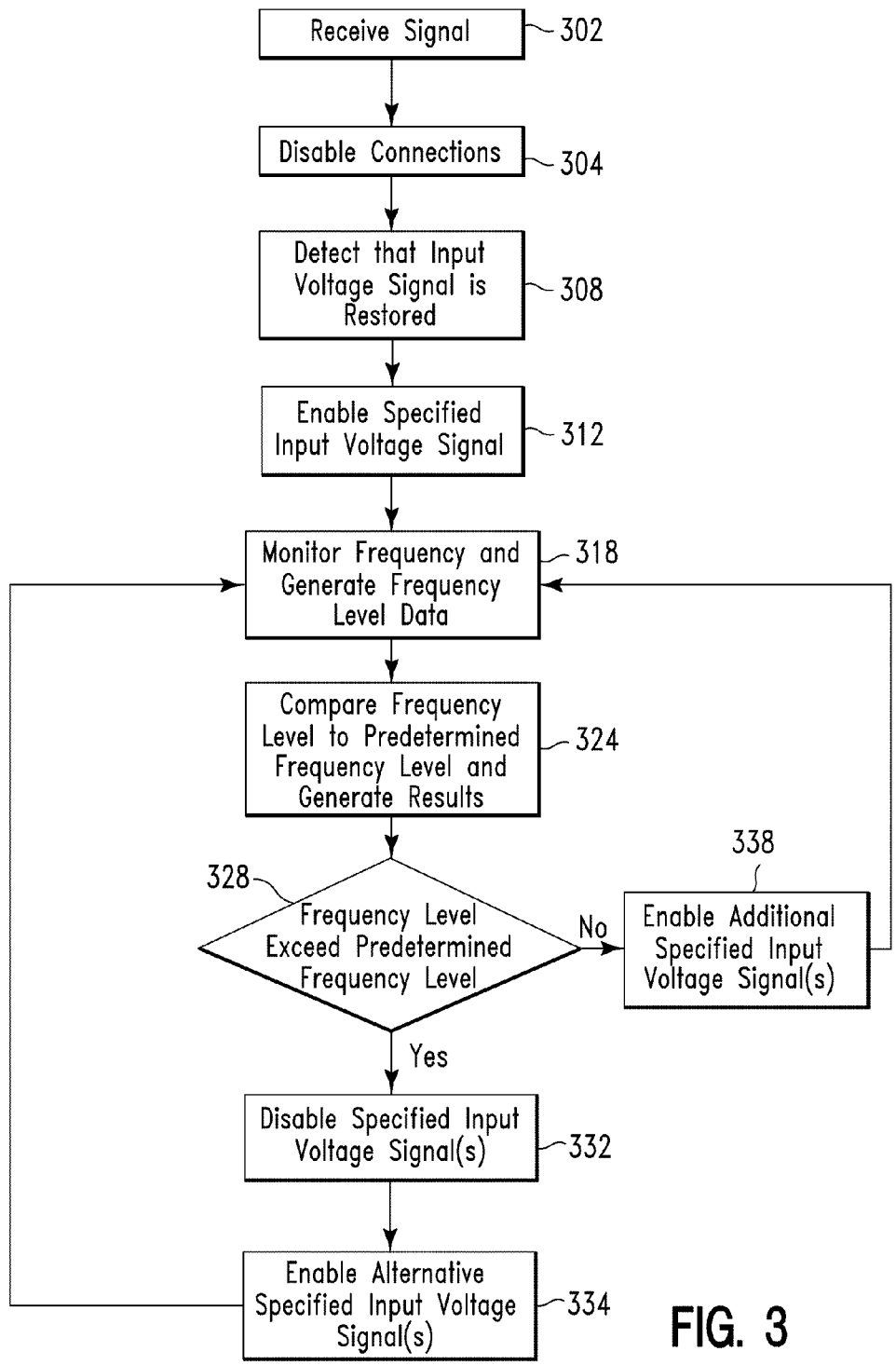
FIG. 3 illustrates a flowchart describing an algorithm used by the system of FIG. 1 or FIG. 2 for restoring power to power consumption devices after a power outage, in accordance with embodiments of the present invention.

FIG. 3 illustrates a flowchart describing an algorithm used by system 2 of FIG. 1 or 2a of FIG. 2 for restoring power to power consumption devices after a power outage, in accordance with embodiments of the present invention. In step 302, a computing apparatus (e.g., a computer processor of computing apparatus 8a or 8b of FIG. 1) receives a signal indicating that a power outage has ended and that an input voltage signal used for powering power consumption devices at a specified location power will be enabled. The computing apparatus comprises a memory device storing a profile indicating an order for enabling each power consumption device. Alternatively, a additional (regional) computing apparatus (e.g., computing apparatus 8c of FIG. 2) may receive the signal indicating that a power outage has ended and that an input voltage signal used for powering power consumption devices at a specified location power will be enabled. In this alternative embodiment, the computing apparatus (e.g., computing apparatus 8c of FIG. 2) controls the computing apparatuses (e.g., computing apparatus 8a and 8b) at the locations thereby enabling a hierarchal command structure for enabling devices after a power outage. In step 304, the computing apparatus (e.g., computing apparatus 8a or 8b of FIG. 1) disables input voltage signal connections to each power consumption device. In step 308, the computing apparatus detects that the input voltage signal (i.e., from the utility(s)) at the specified location is enabled. In step 312, the computing apparatus enables (i.e., in response to step 308 and based on the profile) a first specified input voltage signal connection(s) associated with a first power consumption device(s) of the power consumption devices thereby enabling the first power consumption device(s) to receive the input voltage signal (i.e., allowing the first power consumption device(s) to power up and perform intended functions). In step 318, the computing apparatus monitoring a frequency signal associated with the input voltage signal at the specified location and generates frequency level data comprising a current frequency level of the frequency signal. In step 324, the computing apparatus compares current frequency level to a predetermined frequency level value (e.g., 60 Hz) and generates results data. In step 328, it is determined if the current frequency level exceeds the predetermined frequency level value.

If in step 328, it is determined that the current frequency level exceeds the predetermined frequency level value then in step 332, the computing apparatus disables first specified input voltage signal connection(s) thereby disabling the first power consumption device(s) from receiving the input voltage signal. The computing apparatus may additionally (and optionally) transmit the results data (i.e., generated in step 324) to a power provider entity computer associated with the utility supplying the input voltage signal. In response, the power provider may transmit approval data indicating permission to perform step 334 as described, infra. In step 334, the computing apparatus enables (i.e., in response to step 332 and based on the profile) a second alternative input voltage signal connection(s) associated with a second power consumption device(s) thereby enabling the second power consumption device(s) to receive the input voltage signal and step 318 is repeated.

If in step 328, it is determined that the predetermined frequency level value exceeds the current frequency level then in step 338, the computing apparatus enables (i.e., based on the profile) a second additional input voltage signal connection(s) associated with a second power consumption device(s) thereby enabling the second power consumption device(s) to receive the input voltage signal and step 318 is repeated.

Figure 4:
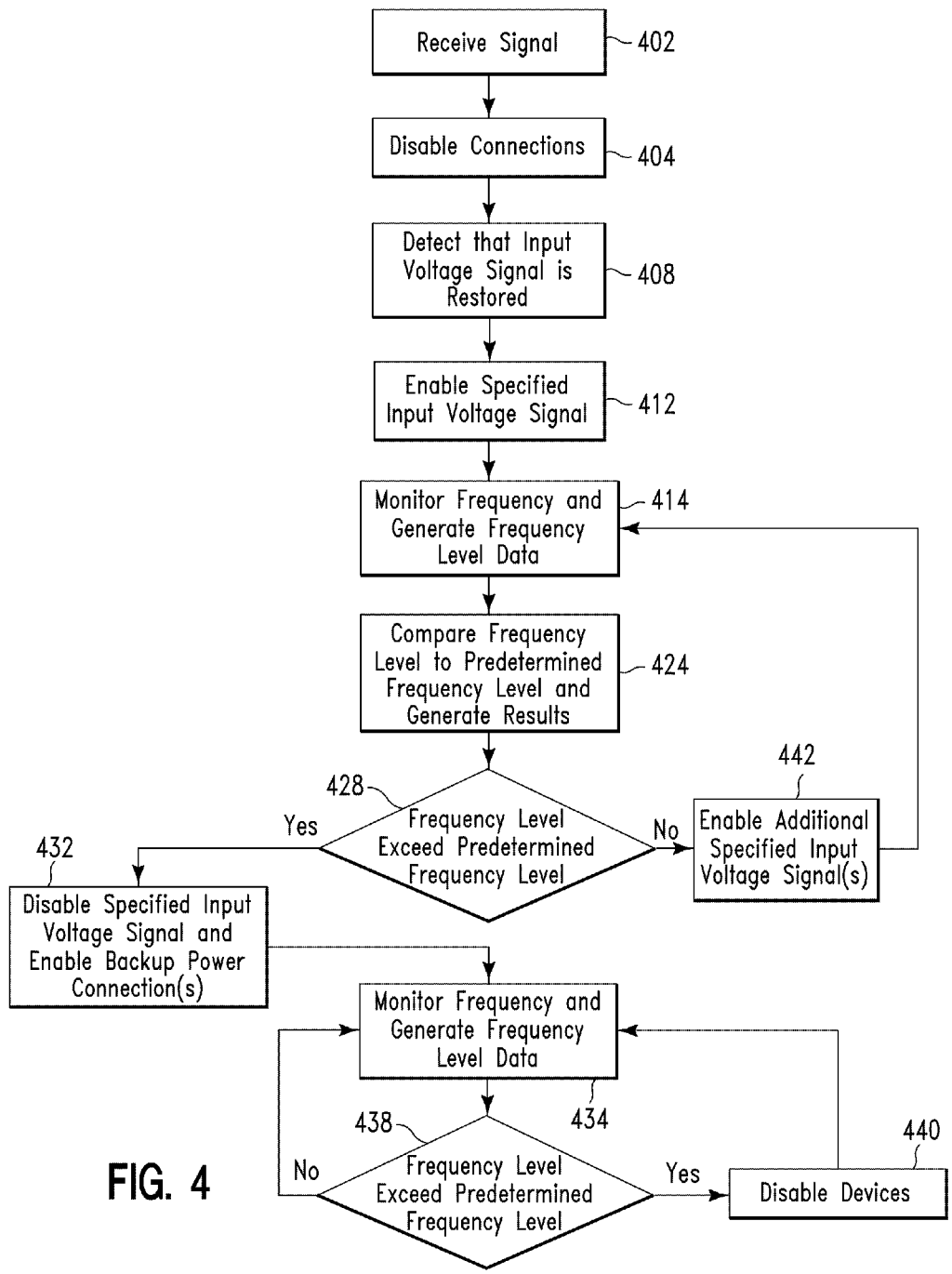
FIG. 4 illustrates a flowchart describing an alternative algorithm to the algorithm of FIG. 3, in accordance with embodiments of the present invention.

FIG. 4 illustrates a flowchart describing an alternative algorithm to the algorithm of FIG. 3 for restoring power to power consumption devices after a power outage, in accordance with embodiments of the present invention. In step 402, a computing apparatus (e.g., a computer processor of computing apparatus 8a or 8b of FIG. 1) receives a signal indicating that a power outage has ended and that an input voltage signal used for powering power consumption devices at a specified location power will be enabled. The computing apparatus comprises a memory device storing a profile indicating an order for enabling each power consumption device. Alternatively, a additional (regional) computing apparatus (e.g., computing apparatus 8c of FIG. 2) may receive the signal indicating that a power outage has ended and that an input voltage signal used for powering power consumption devices at a specified location power will be enabled. In this alternative embodiment, the computing apparatus (e.g., computing apparatus 8c of FIG. 2) controls the computing apparatuses (e.g., computing apparatus 8a and 8b) at the locations thereby enabling a hierarchal command structure for enabling devices after a power outage. In step 404, the computing apparatus (e.g., computing apparatus 8a or 8b of FIG. 1) disables input voltage signal connections to each power consumption device. In step 408, the computing apparatus detects that the input voltage signal (i.e., from the utility(s)) at the specified location is enabled. In step 412, the computing apparatus enables (i.e., in response to step 408 and based on the profile) a first specified input voltage signal connection(s) associated with a first power consumption device(s) of the power consumption devices thereby enabling the first power consumption device(s) to receive the input voltage signal (i.e., allowing the first power consumption device(s) to power up and perform intended functions). In step 414, the computing apparatus monitoring a frequency signal associated with the input voltage signal at the specified location and generates frequency level data comprising a current frequency level of the frequency signal. In step 424, the computing apparatus compares current frequency level to a predetermined frequency level value (e.g., 60 Hz) and generates results data. In step 428, it is determined if the current frequency level exceeds the predetermined frequency level value.

If in step 428, it is determined that the current frequency level exceeds the predetermined frequency level value then in step 432, the computing apparatus disables first specified input voltage signal connection(s) thereby disabling the first power consumption device(s) from receiving the input voltage signal. Additionally, the computing apparatus enables (i.e., in response to step 432 and based on the profile) a backup connection between a rechargeable power source (e.g., a battery(s)) at the specified location and the first and/or a second power consumption device(s) thereby enabling the first and/or second power consumption device(s) to receive a backup voltage signal from the rechargeable power source for powering the first and/or second power consumption device(s). In step 434, the computing apparatus monitors (e.g., after a specified time period has elapsed since enabling said backup connection) the frequency signal associated with the input voltage signal at the specified location. In step 438, it is determined if the current frequency level exceeds the predetermined frequency level value. If in step 438, it is determined that the current frequency level exceeds the predetermined frequency level value then in step 440, additional power consumption devices are disconnected and step 434 is repeated. If in step 438, it is determined that the predetermined frequency level value exceeds the current frequency level then step 434 is repeated.

If in step 428, it is determined that the predetermined frequency level value exceeds the current frequency level then in step 442, the computing apparatus enables (i.e., based on the profile) a second additional input voltage signal connection(s) associated with a second power consumption device(s) thereby enabling the second power consumption device(s) to receive the input voltage signal and step 414 is repeated.

Figure 5:
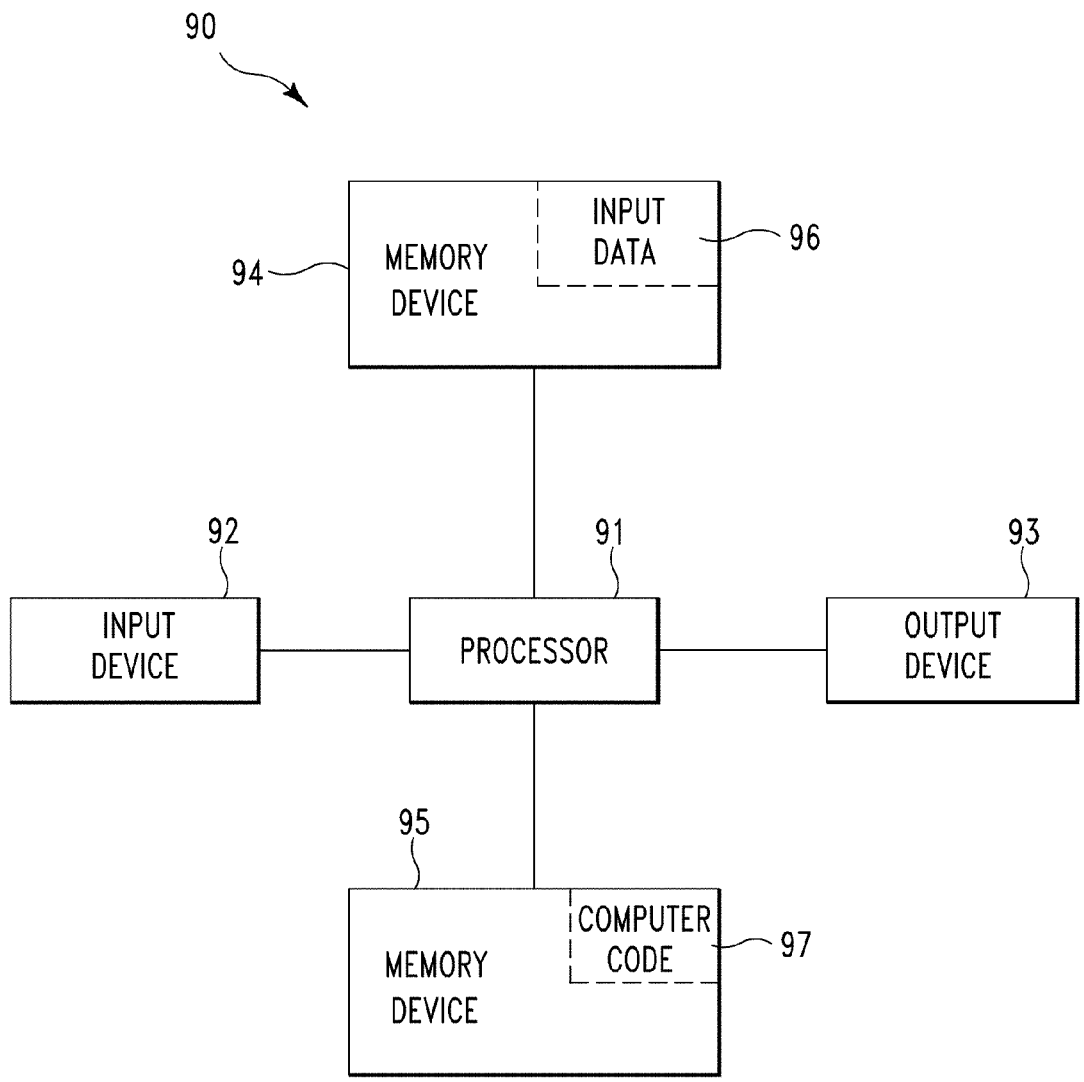
FIG. 5 illustrates a computer apparatus used for restoring power to power consumption devices after a power outage, in accordance with embodiments of the present invention.

FIG. 5 illustrates a computer apparatus 90 (e.g., computing system 8a, 8b, or 8c of FIGS. 1 and 2) used for restoring power to power consumption devices after a power outage, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-3) for restoring power to power consumption devices after a power outage. The processor 91 enables the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 2-3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture)

of the computer system 90 may comprise said computer usable medium (or said program storage device).

Still yet, any of the components of the present invention could be created, integrated, hosted, maintained, deployed, managed, serviced, etc. by a service supplier who offers to for restore power to power consumption devices after a power outage. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for restoring power to power consumption devices after a power outage. In another embodiment, the invention provides a business method that performs the process steps of the invention on a subscription, advertising, and/or fee basis. That is, a service supplier, such as a Solution Integrator, could offer to restore power to power consumption devices after a power outage. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A power restoration method comprising:
    receiving, by a computer processor of a computing apparatus, a signal indicating that a power outage has ended and that an input voltage signal used for powering power consumption devices at a first specified location power will be enabled, said computing apparatus comprising a memory device, said memory device comprising a profile indicating an order for enabling each power consumption device of said power consumption devices;
    disabling, by said computer processor, input voltage signal connections to each said power consumption device;
    detecting, by said computer processor, that said input voltage signal at said first specified location is enabled;
    first enabling, by said computer processor in response to said detecting and based on said profile, a first input voltage signal connection of said input voltage signal connections, wherein said first input voltage signal connection is associated with a first power consumption device of said power consumption devices, and wherein said first enabling said first input voltage signal connection enables said first power consumption device to receive said input voltage signal;
    first monitoring, by said computer processor in response to said first enabling, a frequency signal associated with said input voltage signal at said first specified location;
    generating, by said computer processor, first frequency level data associated with said first monitoring, wherein said first frequency level data comprises a first frequency level of said frequency signal;
    first comparing, by said computer processor, said first frequency level to a predetermined frequency level value; and
    generating, by said computer processor, first results data comprising first results of said first comparing.

2. The method of claim 1, wherein said first results data indicates that said first frequency level exceeds said predetermined frequency level value, and wherein said method further comprises:
    first disabling, by said computer processor in response to said first results data, said first input voltage signal connection, wherein said first disabling said first input voltage signal connection disables said first power consumption device from receiving said input voltage signal;
    second enabling, by said computer processor, in response to said first disabling and based on said profile, a second input voltage signal connection of said input voltage signal connections, wherein said second input voltage signal connection is associated with a second power consumption device of said power consumption devices, and wherein said second enabling said second input voltage signal connection enables said second power consumption device to receive said input voltage signal;
    second monitoring, by said computer processor in response to said second enabling, said frequency signal associated with said input voltage signal at said first specified location;
    generating, by said computer processor, second frequency level data associated with said second monitoring, wherein said second frequency level data comprises a second frequency level of said frequency signal;
    second comparing, by said computer processor, said second frequency level to said predetermined frequency level value; and
    generating, by said computer processor, second results data comprising second results of said second comparing.

3. The method of claim 2, further comprising:
    before said second enabling, transmitting by said computer processor, said first results data to a power provider entity computer associated with a power provider entity supplying said input voltage signal; and
    receiving, by said computer processor from said power provider entity computer, approval data indicating permission to perform said second enabling.

4. The method of claim 1, wherein said first results data indicates that said predetermined frequency level value exceeds said first frequency level, and wherein said method further comprises:
    second enabling, by said computer processor, in response to said first results data and based on said profile, a second input voltage signal connection of said input voltage signal connections, wherein said second input voltage signal connection is associated with a second power consumption device of said power consumption devices, and wherein said second enabling said second input voltage signal connection enables said second power consumption device to receive said input voltage signal;
    second monitoring, by said computer processor in response to said second enabling, said frequency signal associated with said input voltage signal at said first specified location;
    generating, by said computer processor, second frequency level data associated with said second monitoring, wherein said second frequency level data comprises a second frequency level of said frequency signal;

second comparing, by said computer processor, said second frequency level to said predetermined frequency level value; and generating, by said computer processor, second results data comprising second results of said second comparing.

5. The method of claim 1, further comprising:

before said second enabling, transmitting by said computer processor, said first results data to a power provider entity computer associated with a power provider entity supplying said input voltage signal; and receiving, by said computer processor from said power provider entity computer, approval data indicating permission to perform said second enabling.

6. The method of claim 1, wherein said first results data indicates that said predetermined frequency level value exceeds said first frequency level, and wherein said method further comprises:

second enabling, by said computer processor, in response to said first results data and based on said profile, a group of voltage signal connections of said input voltage signal connections, wherein said group of voltage signal connections are associated with a group of power consumption devices of said power consumption devices, and wherein said second enabling said group of voltage signal connections enables said group of power consumption devices to receive said input voltage signal;

second monitoring, by said computer processor in response to said second enabling, said frequency signal associated with said input voltage signal at said first specified location;

generating, by said computer processor, second frequency level data associated with said second monitoring, wherein said second frequency level data comprises a second frequency level of said frequency signal;

second comparing, by said computer processor, said second frequency level to said predetermined frequency level value; and generating, by said computer processor, second results data comprising second results of said second comparing.

7. The method of claim 1, wherein said first results data indicates that said first frequency level exceeds said predetermined frequency level value, and wherein said method further comprises:

enabling, by said computer processor in response to said first results data and based on said profile, a backup connection between a first rechargeable power source and a second power consumption device of said power consumption devices, wherein said enabling said backup connection enables said second power consumption device to receive a backup voltage signal from said first rechargeable power source, and wherein said backup voltage signal powers said second power consumption device;

second monitoring, by said computer processor after a specified time period has elapsed since said enabling said backup connection, said frequency signal associated with said input voltage signal at said first specified location;

generating, by said computer processor, second frequency level data associated with said second monitoring, wherein said second frequency level data comprises a second frequency level of said frequency signal;

second comparing, by said computer processor, said second frequency level to said predetermined frequency level value; and generating, by said computer processor, second results data comprising second results of said second comparing.

8. The method of claim 7, wherein said second results data indicates that said predetermined frequency level value exceeds said second frequency level, and wherein said method further comprises:

disabling, by said computer processor based on said second results data, said backup connection between said first rechargeable power source and said second power consumption device;

second enabling, by said computer processor in response to said second results data and said disabling said backup connection, a second input voltage signal connection of said input voltage signal connections, wherein said second input voltage signal connection is associated with said second power consumption device, and wherein said second enabling said second input voltage signal connection enables said second power consumption device to receive said input voltage signal;

third monitoring, by said computer processor in response to said second enabling, said frequency signal associated with said input voltage signal at said first specified location;

generating, by said computer processor, third frequency level data associated with said third monitoring, wherein said third frequency level data comprises a third frequency level of said frequency signal;

third comparing, by said computer processor, said third frequency level to said predetermined frequency level value; and generating, by said computer processor, third results data comprising third results of said third comparing.

9. The method of claim 1, further comprising:

transmitting, by said computer processor to a power provider entity computer associated with a power provider entity supplying said input voltage signal, said first results data and data indicating said first enabling.

10. The method of claim 1, wherein said signal is received directly from a power provider entity supplying said input voltage signal.

11. The method of claim 1, wherein said signal is received from a regional manager computer connected between said a power provider entity supplying said input voltage signal and said computer processor.

12. The method of claim 1, wherein said input voltage signal connections are comprised by a plurality of relays.

13. The method of claim 1, wherein said profile comprises data selected from the group consisting of a current time of day, a type of apparatus associated with each power consumption device of said power consumption devices, and an amount of power consumed by each said power consumption device.

14. A computer program product, comprising a computer storage medium comprising a computer readable program code embodied therein, said computer readable program code configured to perform the method of claim 1 upon being enabled by said computer processor of said computing apparatus.

15. A process for supporting computer infrastructure, said process comprising providing at least one support service for at least one of creating, integrating, hosting, maintaining, and deploying computer-readable code in said computer processor, wherein the code in combination with the computer processor is capable of performing the method of claim 1.

16. A computing system comprising a computer processor coupled to a computer-readable memory unit, said memory unit comprising instructions that when enabled by the computer processor implements a power restoration method comprising:

receiving, by said computer processor, a signal indicating that a power outage has ended and that an input voltage signal used for powering power consumption devices at a first specified location power will be enabled, said computing apparatus comprising a memory device, said memory device comprising a profile indicating an order for enabling each power consumption device of said power consumption devices;

disabling, by said computer processor, input voltage signal connections to each said power consumption device;

detecting, by said computer processor, that said input voltage signal at said first specified location is enabled;

first enabling, by said computer processor in response to said detecting and based on said profile, a first input voltage signal connection of said input voltage signal connections, wherein said first input voltage signal connection is associated with a first power consumption device of said power consumption devices, and wherein said first enabling said first input voltage signal connection enables said first power consumption device to receive said input voltage signal;

first monitoring, by said computer processor in response to said first enabling, a frequency signal associated with said input voltage signal at said first specified location;

generating, by said computer processor, first frequency level data associated with said first monitoring, wherein said first frequency level data comprises a first frequency level of said frequency signal;

first comparing, by said computer processor, said first frequency level to a predetermined frequency level value; and generating, by said computer processor, first results data comprising first results of said first comparing.

17. The computing system of claim 16, wherein said first results data indicates that said first frequency level exceeds said predetermined frequency level value, and wherein said method further comprises:

first disabling, by said computer processor in response to said first results data, said first input voltage signal connection, wherein said first disabling said first input voltage signal connection disables said first power consumption device from receiving said input voltage signal;

second enabling, by said computer processor, in response to said first disabling and based on said profile, a second input voltage signal connection of said input voltage signal connections, wherein said second input voltage signal connection is associated with a second power consumption device of said power consumption devices, and wherein said second enabling said second input voltage signal connection enables said second power consumption device to receive said input voltage signal;

second monitoring, by said computer processor in response to said second enabling, said frequency signal associated with said input voltage signal at said first specified location;

generating, by said computer processor, second frequency level data associated with said second monitoring, wherein said second frequency level data comprises a second frequency level of said frequency signal;

second comparing, by said computer processor, said second frequency level to said predetermined frequency level value; and generating, by said computer processor, second results data comprising second results of said second comparing.

18. The computing system of claim 17, wherein said method further comprises:

before said second enabling, transmitting by said computer processor, said first results data to a power provider entity computer associated with a power provider entity supplying said input voltage signal; and receiving, by said computer processor from said power provider entity computer, approval data indicating permission to perform said second enabling.

19. The computing system of claim 16, wherein said first results data indicates that said predetermined frequency level value exceeds said first frequency level, and wherein said method further comprises:

second enabling, by said computer processor, in response to said first results data and based on said profile, a second input voltage signal connection of said input voltage signal connections, wherein said second input voltage signal connection is associated with a second power consumption device of said power consumption devices, and wherein said second enabling said second input voltage signal connection enables said second power consumption device to receive said input voltage signal;

second monitoring, by said computer processor in response to said second enabling, said frequency signal associated with said input voltage signal at said first specified location;

generating, by said computer processor, second frequency level data associated with said second monitoring, wherein said second frequency level data comprises a second frequency level of said frequency signal;

second comparing, by said computer processor, said second frequency level to said predetermined frequency level value; and generating, by said computer processor, second results data comprising second results of said second comparing.

20. The computing system of claim 16, wherein said method further comprises:

before said second enabling, transmitting by said computer processor, said first results data to a power provider entity computer associated with a power provider entity supplying said input voltage signal; and receiving, by said computer processor from said power provider entity computer, approval data indicating permission to perform said second enabling.

* * * * *